Figure 1:
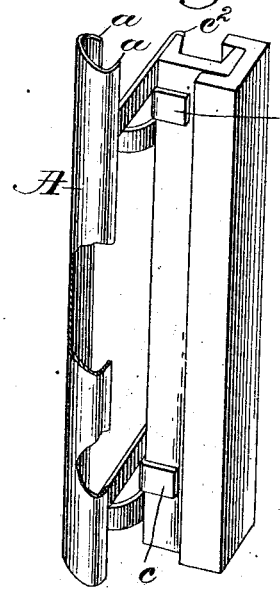

No. 617,881. Patented Jan. 17, 1899.
E. B. MARSH.
CORNER BEAD.
(Application filed Apr. 24, 1896.)
(No Model.) 2 Sheets—Sheet 1.

Witnesses:
A. C. Harmon.
Thomas J. Drummond.

Inventor:
Edward B. Marsh.
by Crosby Gregory
attys.

No. 617,881. Patented Jan. 17, 1899.
E. B. MARSH.
CORNER BEAD.
(Application filed Apr. 24, 1896.)

(No Model.) 2 Sheets—Sheet 2.

Witnesses:
A. C. Harmon.
Thomas J. Drummond.

Inventor:
Edward B. Marsh.
by Crosby Gregory, attys.

UNITED STATES PATENT OFFICE.

EDWARD B. MARSH, OF AMHERST, MASSACHUSETTS, ASSIGNOR TO FRANCIS R. ALLEN, OF BOSTON, MASSACHUSETTS.

CORNER-BEAD.

SPECIFICATION forming part of Letters Patent No. 617,881, dated January 17, 1899.

Application filed April 24, 1896. Serial No. 588,881. (No model.)

*To all whom it may concern:*

Be it known that I, EDWARD B. MARSH, of Amherst, county of Hampshire, State of Massachusetts, have invented an Improvement in Corner-Beads, of which the following description, in connection with the accompanying drawings, is a specification, like letters on the drawings representing like parts.

My invention relates to improvements and modifications of my previous invention in corner-beads for plastering covered in my application for Letters Patent Serial No. 575,950. In the said former invention, in one form thereof, I provided longitudinal depressions or cavities in the sides of the bead and secured the bead to the framework or corner-post by means of ears embracing the bead or engaging it on the outside thereof.

According to the present invention I provide one or more cavities at the rear side of the bead, preferably a single cavity extending throughout the length thereof, and extending rearwardly from the edges of this cavity are suitable holders, which are secured to the post or other convenient part of the frame of the building to properly support the bead standing out clear of the post. These holders may be formed separately as attachments to be secured to the post and having their ears extended forward divergently to bear within the bead-cavity against the inner sides of the edges thereof or they may be formed integrally with the bead, particularly when the latter is made of sheet metal, as I prefer to make it.

One main advantage of the former construction, where the holders bear against the inner sides of the cavity, as stated, is that the holders, being divergently extended, receive any external blow or thrust to which the bead may be subjected without any possibility of slipping from the bead or of becoming otherwise disconnected therefrom. In fact, the greater the pressure brought against the outside of the bead the greater is the resistance offered by the holders, and the pressure merely tends to force the holders more snugly into the internal corners of the bead, causing them to brace each other and the bead. However, in addition to this bracing effect I have also in one form of my invention provided braces, as such, to be used in connection with the bead as a part thereof or as a part of the holders.

In the preferred construction of my improved corner-bead I use sheet metal rolled over at its edges in order to form lateral surfaces to receive the plaster and behind which the plaster may be clenched. These rolled-over portions may be rolled or otherwise formed in a sharp angle or in a more or less rounded contour in cross-section, as desired.

My invention is equally applicable to steel or wooden frame buildings, and in connection with the former I have devised readily-applied holders for clamping the bead to the channel-iron of the post with absolute firmness.

For the best results the bead is secured in permanently-fixed position removed from the inner surface line of the plastering, so that the plaster may extend substantially flush with the outer surface or edge of the bead at either side thereof and also enter within and behind the same for the purpose of being solidly clenched about the rear portion of said bead, while at the same time avoiding the disadvantage of having a thin plaster edge adjacent to the bead.

Further advantages of my invention will appear in the course of the following detailed description thereof and in connection with the accompanying claims, which more definitely point out my invention.

Figure 6:
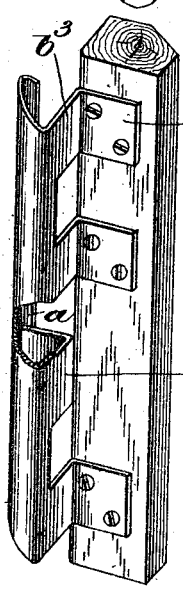
Figure 7:
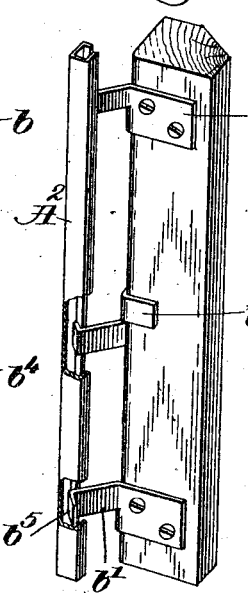
Figure 8:
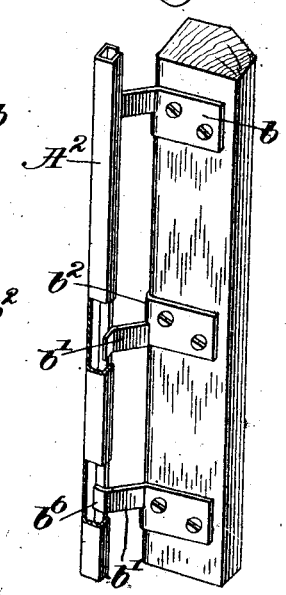
Figure 9:
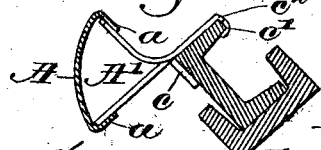
Figure 10:
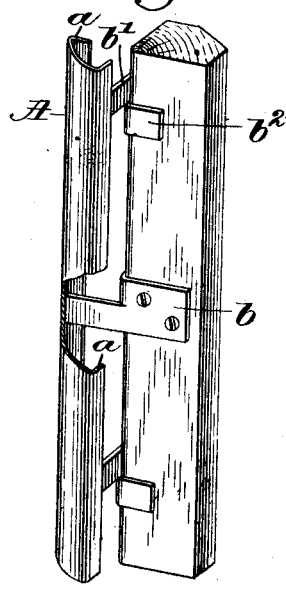
Figure 11:
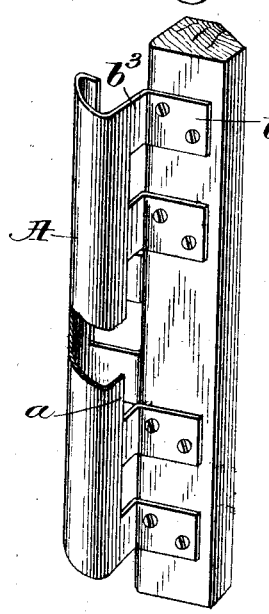
Figure 12:
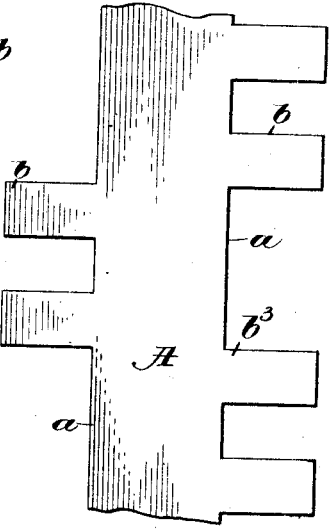
Figure 13:
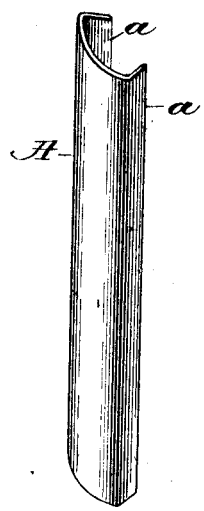
Figure 14:
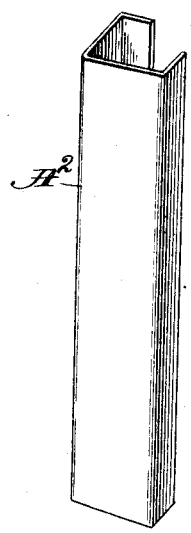
Figure 15:
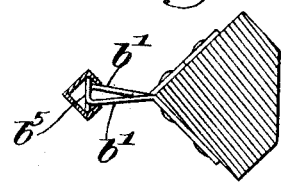
Figure 16:
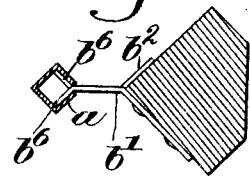

In the accompanying drawings, illustrative of the preferred forms of my invention, Figure 1 is a perspective view of one form of the corner-bead and holder secured to an ordinary channel-iron corner-post, as commonly found in fireproof iron buildings. Figs. 2, 3, 4, and 5 are similar perspective views showing modified forms of holders for securing the corner-bead. Fig. 6 is a similar perspective view in which the holders are made integral with the bead and also showing one form of brace for the bead. Figs. 7 and 8 are similar perspective views showing a modified form of bead and also showing a terminal lip or laterally-bent end portion of the holders. Fig. 9 is a horizontal section of Fig. 1. Fig. 10 is a perspective view showing one form of the corner-bead supported by a modified form of holder. Fig. 11 is a similar perspective view of a modification of the bead having its holders formed integrally therewith, as shown in Fig. 6. Fig. 12 is a plan view of the blank from which the bead shown in Fig. 11 is formed. Figs. 13 and 14 are enlarged perspectives of my preferred forms of corner-beads. Fig. 15 is a horizontal section of Fig. 7. Fig. 16 is a sectional view illustrating a modified form of the holder shown in Fig. 8.

In the preferred embodiment of my invention as herein set forth, A designates the corner-bead, having its edges $a$ rearwardly and inwardly disposed, thereby forming an internal cavity A' at the rear side of the bead. This bead is preferably formed of sheet metal, in which case the edges will be rolled over or bent to the form desired, leaving an extended face surface and a single longitudinal rear cavity.

In case the bead is not made of metal or if for any reason it is found desirable the rear cavity A' need not extend the entire length of the bead, but may be made in sections or pockets here and there throughout the length of the bead at such points as it is desired for the purpose of receiving the holders or affording increased facility for clenching the plaster behind the bead.

I have herein shown two forms of beads, the form A having a curved outer face of considerable relative extent and the form $A^2$, Figs. 7, 8, and 14 to 16, having its face portion formed with two plane surfaces meeting at a sharp angle and being preferably considerably smaller in size than the curved form A of the bead. The latter form of bead is readily capable of receiving an ornamental finish, the extended curved face thereof being readily embossed in ornamental pattern or enameled or plated in such artistic finish as may be desired, although the angular form of bead may be enlarged, as shown in Fig. 14, in which case it also may be readily ornamented, as stated. However, I do not limit myself in any way to this particular form of bead, inasmuch as my invention is not restricted to this particular.

Figure 4:
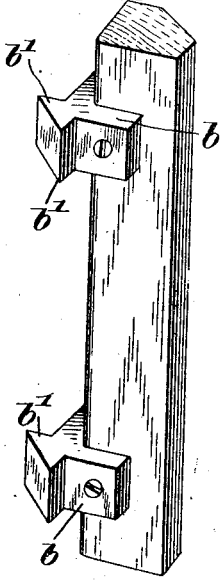

The corner-bead is supported in fixed position removed from the corner-post by means of holders extending laterally with relation to the bead, and these laterally-extended holders may be either formed integrally with the bead itself, as shown in Figs. 6 and 11, or they may be made as separate independent pieces. In the latter instance the holder comprises a shank $b$ and one or more ears $b'$. These holders are preferably formed of sheet metal, although they may be formed of cast metal or wood or other material, as indicated in Fig. 4. When formed of sheet metal, the metal is preferably provided with one or more slits extending inwardly from the outer edge. Certain of the portions formed thereby may be bent back substantially at right angles to the shank $b$ to constitute stops $b^2$ for gripping the corner of the post, as shown, while other portions thereof will constitute the ears $b'$.

In Figs. 1, 2, 9, and 16 I have shown the holders as having one intermediate stop and two divergently-extended ears, each extending out in a substantially straight line from the shank portion to enter within the cavity A' and bear against the inner sides of the edges $a$ of the bead.

Figure 3:
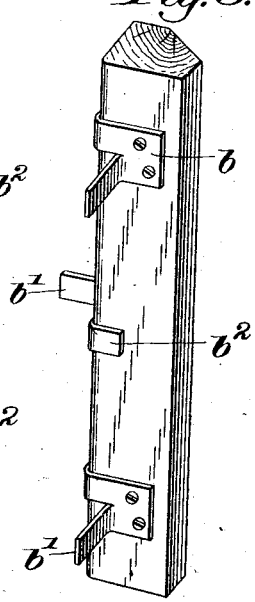

In Figs. 3, 7, 8, and 10 I have shown each holder as comprising one stop and one ear, the latter in Fig. 3 extending laterally from the shank $b$ and in Fig. 10 extending straight ahead directly in line with the shank, the holder in Fig. 3 having its ear bent away from the shank at a point somewhat removed from the corner of the post, thereby providing means for bringing the bead nearer to the post than the construction shown in Fig. 10, for instance.

Figure 2:
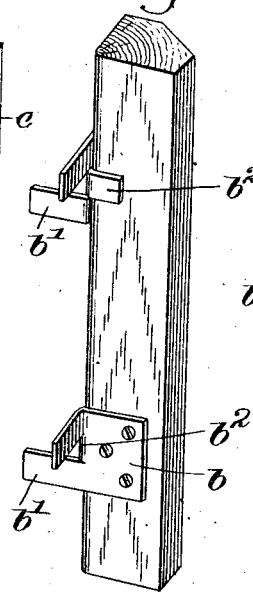
Figure 5:
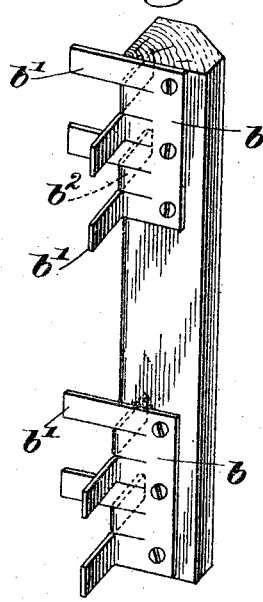

Fig. 5 shows a holder quite similar to that shown in Fig. 2, having, however, a greater number of ears projecting from one and the same shank, and also showing the slits extending inwardly, similarly as in Fig. 3, so that the ears are capable of being bent back farther, if desired.

Where extreme rigidity of support is required for the corner-bead, it is desirable to provide a holder as shown in Fig. 5, in which a large number of ears $b'$ extend from the same shank. It is obvious also that the holders might be thus made in a long strip and cut off in such lengths—that is, with such a number of ears as desired for use.

Referring to Fig. 6, I have shown the holders as comprising a shank $b$ and an ear portion $b^3$, extending from and integral with one of the rearwardly-bent edges of the bead-piece, and in Fig. 11 I have shown certain of these integrally-formed holders extending from one edge and others from the opposite edge, these holders in the latter instance being formed in such numbers as required and being preferably arranged singly or in groups to give alternate support to the bead at either side thereof.

Reference-letter $b^4$, Fig. 6, designates a brace which is desirable to use in the construction shown in Fig. 6, this brace being formed by bending a tongue of the metal extended from the bead inwardly at an angle, so as to rest against the post, the free end thereof being held within the opposite edge $a$ of the bead. In Figs. 7 and 15 I have shown another form of brace, consisting of a laterally-bent lip $b^5$, formed at the extremity of the ear $b'$ of the holder, the holders being successively arranged in reverse order, so that the free ends of the braces $b^5$ bear alternately against the opposite corners of the edges of the bead (see Fig. 15) and the respective ears $b'$ rest snugly against the extreme edges opposite said corners. Either of these braces $b^4$ $b^5$ may obviously be used in connection with any of the beads and holders herein shown and described.

Figs. 8 and 16 show the ears $b'$ as terminating in lip portions $b^6$, bent alternately in opposite directions to rest snugly against the adjacent edges $a$ of the bead, these edges in this instance being separated only sufficiently to permit the ears to enter between the same.

One important feature of my invention resides in the means which I have provided for securing my improved bead and holders to the channel-iron of a fireproof-building frame. This feature of my invention is shown in detail in Figs. 1 and 9. The shank of the holder or other securing means for the bead is provided with laterally-bent clamps $c$ $c'$, adapted to embrace the adjacent portion of the channel-iron at either edge thereof. The clamp, which extends over the flange edge of the channel-iron, is tightly bent around under the same, as is indicated at $c'$, Fig. 9, the channel-iron in the present instance being turned so that its flange edge is adjacent the rear end of the holder. Of course if the channel-iron were turned in the opposite direction the clamp $c$ would be bent under instead of the clamp $c'$. I have also shown the body of the shank as having its rear edge bent at $c^2$ adjacent the clamp $c'$ to add to the effective supporting strength of the holder. The clamps $c$ $c'$ may be formed at any portion of the holder in order to accommodate the latter to the particular structure to which it is to be attached, it being essential only that it should have oppositely-extended clamps to coöperate in gripping the post or other support.

Many changes may be resorted to without departing from the spirit and scope of my invention, and I do not restrict myself in any way to the details of construction as herein shown except as my invention is defined in the claims hereto annexed.

What I claim is—

1. A corner-bead having its edges rearwardly and inwardly disposed, to constitute, together with the back of the bead, means for retaining the plaster substantially flush with the outer surface thereof, combined with means for securing said bead to the frame or post, substantially as described.

2. A corner-bead, having its edges rearwardly disposed and adapted to be embedded in the plaster, and means for holding said bead-piece at all times in fixed position standing out clear of the corner-post, and having openings behind the bead and between the same and the corner-post, substantially as described.

3. A corner-bead, provided at its rear side with a cavity adapted to receive therein suitable supporting means to hold the said bead at all times in fixed position away from the corner-post, substantially as described.

4. A corner-bead, provided at its rear side with a cavity, means to hold said bead supported in fixed position removed from the corner-post, and means to brace said bead in its said fixed position, substantially as described.

5. A corner-bead, provided at its rear side with a cavity, means to hold said bead supported in fixed position removed from the corner-post, and means operating within said cavity against said bead to brace said bead in its said fixed position, substantially as described.

6. A corner-bead provided at its rear side with a pocket, combined with holders adapted to be secured to the corner-post to hold the said bead at all times in fixed position removed from the said post, substantially as described.

7. A corner-bead provided at its rear side with a cavity, combined with holders adapted to be secured to the corner-post, said holders having portions extending divergently outward within said cavity and bearing against said bead to hold the same in position, substantially as described.

8. A corner-bead, extended laterally combined with a plurality of supporting devices therefor divergently arranged and separated at their ends next to the bead to give alternate support to the bead at and connected to either side thereof, ajacent the respective side thereof, substantially as described.

9. A corner-bead having its edges rearwardly and inwardly disposed, combined with holders provided with oppositely-extended ears bearing against the inner sides of said inwardly-disposed edges at either side of the bead to properly maintain the same in position, substantially as described.

10. A sheet-metal corner-bead, rolled over at opposite edges to present holding-surfaces, in combination with holders engaging said holding-surfaces to hold said bead at all times removed from the corner-post, substantially as described.

11. A sheet-metal corner-bead, provided with holders extending laterally with relation to said bead directly from the rearmost edges thereof straight to the wall or corner-post to hold the latter at all times fixedly removed from and standing out clear from the corner-post, with open passages through behind the bead, substantially as described.

12. A metallic holder, having an extended shank adapted to be clamped or otherwise secured to the corner-post, and an ear extending straight out therefrom, and formed to engage the inside of a corner-bead, substantially as described.

13. A sheet-metal holder having a plurality of slits extending from one edge to form ears, certain of said ears being extended straight out in one direction, and certain in a divergent direction, said oppositely-extending ears coöperating to engage the inside of a corner-bead, substantially as described.

14. A metallic holder having at one end suitable holding portions, and at its other end a securing-shank, said shank having at each end a laterally-bent or clamping portion, substantially as described.

In testimony whereof I have signed my name to this specification in the presence of two subscribing witnesses.

EDWARD B. MARSH.

Witnesses:
  GEO. H. MAXWELL,
  FREDERICK L. EMERY.

It is hereby certified that in Letters Patent No. 617,881, granted January 17, 1899, upon the application of Edward B. Marsh, of Amherst, Massachusetts, for an improvement in "Corner-Beads," errors appear in the printed specification requiring correction, as follows: On page 3, line 100, the word "ajacent" should read *adjacent;* same page, line 101, after the word "side" the word *edges* should be inserted, and page 4, line 1, the compound word "oppositely-extending" should read *oppositely extended;* and that the said Letters Patent should be read with these corrections therein that the same may conform to the record of the case in the Patent Office.

Signed, countersigned, and sealed this 24th day of January, A. D., 1899.

[SEAL.]

WEBSTER DAVIS,
*Assistant Secretary of the Interior.*

Countersigned:
C. H. DUELL,
*Commissioner of Patents.*